United States Patent
Petersen, III

(10) Patent No.: US 12,490,212 B2
(45) Date of Patent: Dec. 2, 2025

(54) METHOD FOR PERFORMING SYNCHRONIZATION IN DISTRIBUTED CARRIER COMMUNICATIONS

(71) Applicant: Spectric Labs, Inc., Chantilly, VA (US)

(72) Inventor: Willis Lauritz Petersen, III, San Antonio, TX (US)

(73) Assignee: Spectric Labs, Inc., Chantilly, VA (US)

( * ) Notice: Subject to any disclaimer, the term of this patent is extended or adjusted under 35 U.S.C. 154(b) by 465 days.

(21) Appl. No.: 18/188,556

(22) Filed: Mar. 23, 2023

(65) Prior Publication Data

US 2023/0309039 A1 Sep. 28, 2023

Related U.S. Application Data

(60) Provisional application No. 63/324,181, filed on Mar. 28, 2022.

(51) Int. Cl.
*H04W 56/00* (2009.01)
*H04K 3/00* (2006.01)
*H04L 9/40* (2022.01)

(52) U.S. Cl.
CPC ........ *H04W 56/0015* (2013.01); *H04K 3/827* (2013.01); *H04W 56/0035* (2013.01); *H04L 63/162* (2013.01)

(58) Field of Classification Search
CPC . H04K 3/827; H04L 63/162; H04W 56/0015; H04W 56/0035
See application file for complete search history.

(56) References Cited

U.S. PATENT DOCUMENTS

| | | | | |
|---|---|---|---|---|
| 5,818,825 A | * | 10/1998 | Corrigan | H04N 7/17309 370/347 |
| 6,549,544 B1 | * | 4/2003 | Kroeger | H04L 5/0048 370/514 |

(Continued)

FOREIGN PATENT DOCUMENTS

| | | | | |
|---|---|---|---|---|
| CN | 105659675 A | * | 6/2016 | ........... H04B 7/2656 |
| CN | 110944380 A | * | 3/2020 | ........... H04B 7/0413 |

(Continued)

*Primary Examiner* — Wutchung Chu
(74) *Attorney, Agent, or Firm* — Michael P. Fortkort, Esq.; Protorae Law PLLC

(57) ABSTRACT

A highly efficient distributed synchronization (DS) uses waveforms that can be easily detected by the receiver while possessing desirable LPI/LPD characteristics. Differentially encoding the synchronization pattern reduces receiver computation because signal detection search space is collapsed to a single dimension. Dissimilar bursts are used for synchronization to remove correlated energy between different sets, while maintaining the same differentially encoded pattern. The DS functions only as a whole and not as individual carriers or channels. No single carrier conveys any useful information. All cross-channel coherence required for proper alignment and subsequent detection of the distributed synchronization set of bursts is possible due to large transmission hardware IF bandwidth. The synchronization pattern is differentially encoded by randomly generating two sets of complex numbers that are the same size as the synchronization pattern where the point-wise product of the second set with the conjugate of the first set comprises the synchronization pattern.

20 Claims, 13 Drawing Sheets

(56) References Cited

U.S. PATENT DOCUMENTS

| | | | | |
|---|---|---|---|---|
| 6,917,601 | B2 * | 7/2005 | Schilling | H04W 52/346 |
| | | | | 370/335 |
| 7,260,100 | B1 * | 8/2007 | Snodgrass | H04L 45/00 |
| | | | | 370/324 |
| 7,280,464 | B1 * | 10/2007 | Newhouse | H04L 27/2662 |
| | | | | 370/203 |
| 11,202,270 | B2 * | 12/2021 | Kim | H04L 5/0094 |
| 11,444,670 | B1 * | 9/2022 | Kleider | H04B 7/024 |
| 11,652,680 | B1 * | 5/2023 | Sherman | H04L 27/2663 |
| | | | | 342/196 |
| 2005/0094640 | A1 * | 5/2005 | Howe | H04L 47/2416 |
| | | | | 370/474 |
| 2011/0268079 | A1 * | 11/2011 | Akita | H04L 27/2613 |
| | | | | 370/329 |
| 2021/0167939 | A1 * | 6/2021 | Yoshida | H04L 7/00 |
| 2021/0314201 | A1 * | 10/2021 | Nikitin | H04L 25/08 |
| 2022/0399989 | A1 * | 12/2022 | Sherman | H04L 9/14 |

FOREIGN PATENT DOCUMENTS

| | | | | | |
|---|---|---|---|---|---|
| CN | 111699728 | A | * | 9/2020 | H04W 52/0274 |
| CN | 113726709 | A | * | 11/2021 | H04L 27/2655 |
| JP | H0799487 | A | * | 4/1995 | H04B 1/70712 |
| WO | WO-2005088884 | A1 | * | 9/2005 | H04L 27/2657 |
| WO | WO-2010062023 | A1 | * | 6/2010 | H04L 25/0204 |
| WO | WO-2022266055 | A1 | * | 12/2022 | H04L 27/2663 |

* cited by examiner

METHOD FOR PERFORMING SYNCHRONIZATION IN DISTRIBUTED CARRIER COMMUNICATIONS

RELATED APPLICATIONS

This application is related to U.S. Provisional Patent Application No. 63/324,181 entitled "Distributed Carrier With Joint Equalization" filed Mar. 28, 2022 bp the same inventor and same Applicant. U.S. Provisional Patent Application No. 63/324,181 is hereby incorporated by reference as if repeated herein in its entirety, including the drawings.

This application is also related to U.S. Non-Provisional Patent Application No. 18/188,539 filed on even date herewith. U.S. Non-Provisional Patent Application No. is also hereby incorporated by reference as if repeated herein in its entirety, including the drawings.

BACKGROUND

The present invention relates generally to communications systems, and more particularly to a communications system for communicating covertly.

Synchronization in covert communications presents problems as the waveform with which one desires to be synchronized tends to possess low probability of intercept/low probability of detection (LPI/LPD) characteristics, thereby making synchronization to such a waveform more difficult without weakening the designed LPI/LPD characteristics of the waveform to which synchronization is desired.

The present invention is therefore directed to the problem of developing an efficient synchronization method within a robust covert communications system that does not decrease the covert characteristics of the communication waveform but rather contributes to the covert characteristics.

SUMMARY OF THE INVENTION

The present invention solves this and other problems by providing a highly efficient synchronization method using a synchronization waveform that requires only limited resources for detection while concomitantly possessing desirable LPI/LPD characteristics (e.g., see LPI/LPD of the distributed carrier waveform described in U.S. Provisional Patent Application No. 63/324,181).

According one aspect of the present invention, a unique distributed synchronization design is provided such that the synchronization functions only as a whole and not as individual carriers or channels even though that is the apparent shape of the waveform.

According to another aspect of the present invention, no single carrier conveys any useful information.

According to another aspect of the present invention, in an exemplary embodiment of a method for performing synchronization, which is particularly useful in covert communications systems that employ LPI/LPD waveforms, a synchronization search pattern is differentially encoded. This greatly reduces the computation required by the receiver because differential encoding reduces the signal detection search space to a single dimension (e.g., time domain) rather than two dimensions (e.g., time and frequency) as is used in existing systems.

According to another aspect of the present invention, an exemplary embodiment of a method for performing synchronization utilizes dissimilar bursts for the distributed synchronization waveform. By so doing, all correlated energy is removed between different sets of synchronization bursts and between individual bursts within a single set of synchronization bursts, while maintaining the same differentially encoded pattern.

According to another aspect of the distributed synchronization of the present invention, each time a set of bursts is generated, the bursts are entirely dissimilar to the previously generated sets of bursts which therefore removes any correlated energy between the different sets of bursts, all while maintaining the same differentially encoded pattern.

According to still another aspect of the present invention, all cross-channel coherence required for proper alignment and subsequent detection of the distributed synchronization set of bursts is possible because of a large intermediate frequency (IF) bandwidth which can be employed in an FPGA based hardware platform.

According to yet another aspect of the present, an exemplary embodiment of a distributed synchronization (DS) system creates a set of DS bursts by first generating a synchronization pattern. The synchronization pattern comprises a set of pseudorandomly chosen complex numbers rather than symbols from any particular complex/QAM constellation although symbols from complex constellations may be used as well. When complex constellation symbols are employed, the amplitudes and phases of the synchronization pattern are thus restricted. It may be desirable to not use a complex constellation but to restrict the amplitudes and phases of the synchronization pattern in some other fashion. The synchronization pattern is differentially encoded by generating two more sets of pseudorandomly chosen complex numbers with the same set size as the synchronization pattern whose conjugate product is the synchronization pattern.

According to another aspect of the present invention, the additional sets are designed such that the point-wise product of the second set with the conjugate of the first set equals the synchronization pattern. Additionally, the magnitude of the additional sets is restricted. This first constraint allows for many degrees of freedom rather than the single degree of freedom offered by traditional differentially encoded symbols. Moreover, this allows a different set of differentially encoded symbols to be generated for every set of bursts all while using the same synchronization pattern.

According to yet another aspect of the present invention, at any given symbol time more random constrained symbols are employed than information carrying symbols. By employing more random constrained symbols than information carrying symbols in each symbol time, the design guarantees that in any particular channel no portion of the synchronization pattern can be found even after performing a delay conjugate multiply (DCM) at the correct lag. The random constrained symbols are chosen so that at every symbol time, the sum of all the constrained channels is zero. As an example, one way this can be accomplished is by employing all n distinct $n^{th}$ roots of unity with each root of unity being phase adjusted by a single random phase amount, one random phase adjustment being chosen for each symbol time. Since the sum of the n distinct $n^{th}$ roots of unity is zero, the sum of the globally phase adjusted set of $n^{th}$ roots of unity will also be zero. Another example mechanism for selecting a random constrained symbol set is to choose n-m complex numbers randomly then m complex numbers whose sum is the negation of the sum of the previously chosen n-m random constrained symbols. This process will guarantee that the sum of the entire set is zero.

According to still another aspect of the present invention, the differentially encoded symbols are distributed strategically through a grid of time and frequency along with the random constrained symbol sets, the strategy for arrangement being described below.

According to still another aspect of the present invention, the arrangement of the information symbols is such that if an information symbol is in Channel N and Symbol Index K then a constrained random symbol will be in Channel N and Symbol Index K plus the length of the sync pattern. Additionally, if an information symbol is in Channel N and Symbol Index K plus the pattern length then a constrained random symbol will be in Channel N and Symbol Index K. This arrangement of the information symbols and constrained random symbols ensures that when an individual channel has a DCM applied to it with a lag of the length of the sync pattern, there will be no information present because a random symbol will be multiplied by the conjugate of an information carrying symbol. Thus, each individual channel will not be correlated with the synchronization pattern even after applying the DCM at the correct lag.

According to still another aspect of the present invention, detection of the synchronization pattern via the correlation with the DCM requires that for any symbol index, the sum of its random constrained symbols is zero and each information carrying symbol is precisely the differentially encoded symbol for that particular symbol index. With these additional requirements in place, summing the grid of symbols down the columns for each symbol index yields a value that is a multiple of the corresponding differentially encoded synchronization pattern symbol, which yields that the DCM of the summed sequence has the synchronization pattern detectable.

According to still another aspect of the present invention, the last stage of the DS set of bursts generation is to up-convert each baseband symbol set to random carrier frequencies within the IF bandwidth of the hardware.

According to yet another aspect of the present invention, to maintain the necessary phase coherence amongst all the symbols, each baseband symbol set is negatively pre-tuned according to the random frequency assigned for that symbol set so that after the symbols are pulse shaped with a Nyquist filter and up-converted, the symbols in each symbol set will have exactly the right phases. Those phases will then be aligned so that when taken as a whole, the entire DCM'ed DS waveform then correlates with the synchronization pattern.

According to yet another aspect of the present invention, each of the different sets of DS bursts is detected with the exact same pattern despite them being widely varying waveforms.

According to still another aspect of the present invention, the current design of the DS waveform is sufficient for the purposes of providing detectability of synchronization information such as timing offset and frequency offset, and yet the same DS waveform is also extensible so that the DS waveform can carry some amount of information as well, where this is accomplished by appending or otherwise interspersing the data symbols to or within the synchronization pattern symbols before generating the DS waveform. Since the data symbols will not be known by the receiver, the pattern for correlation will be the synchronization pattern with zeros inserted where the data symbols were placed.

BRIEF DESCRIPTION OF THE DRAWINGS

Various other objects, features and attendant advantages of the present invention will become fully appreciated as the same becomes better understood when considered in conjunction with the accompanying drawings, in which like reference characters designate the same or similar parts throughout the several views, and wherein.

DETAILED DESCRIPTION

Figure 1:
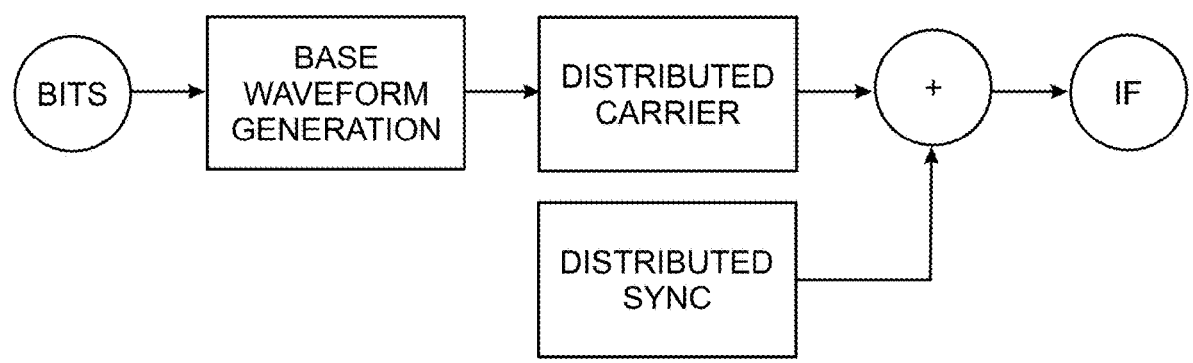
FIG. 1 depicts an overview of an exemplary embodiment of a method for generating an LPI/LPD waveform to which distributed synchronization method of the present invention can be useful.
Figure 2:
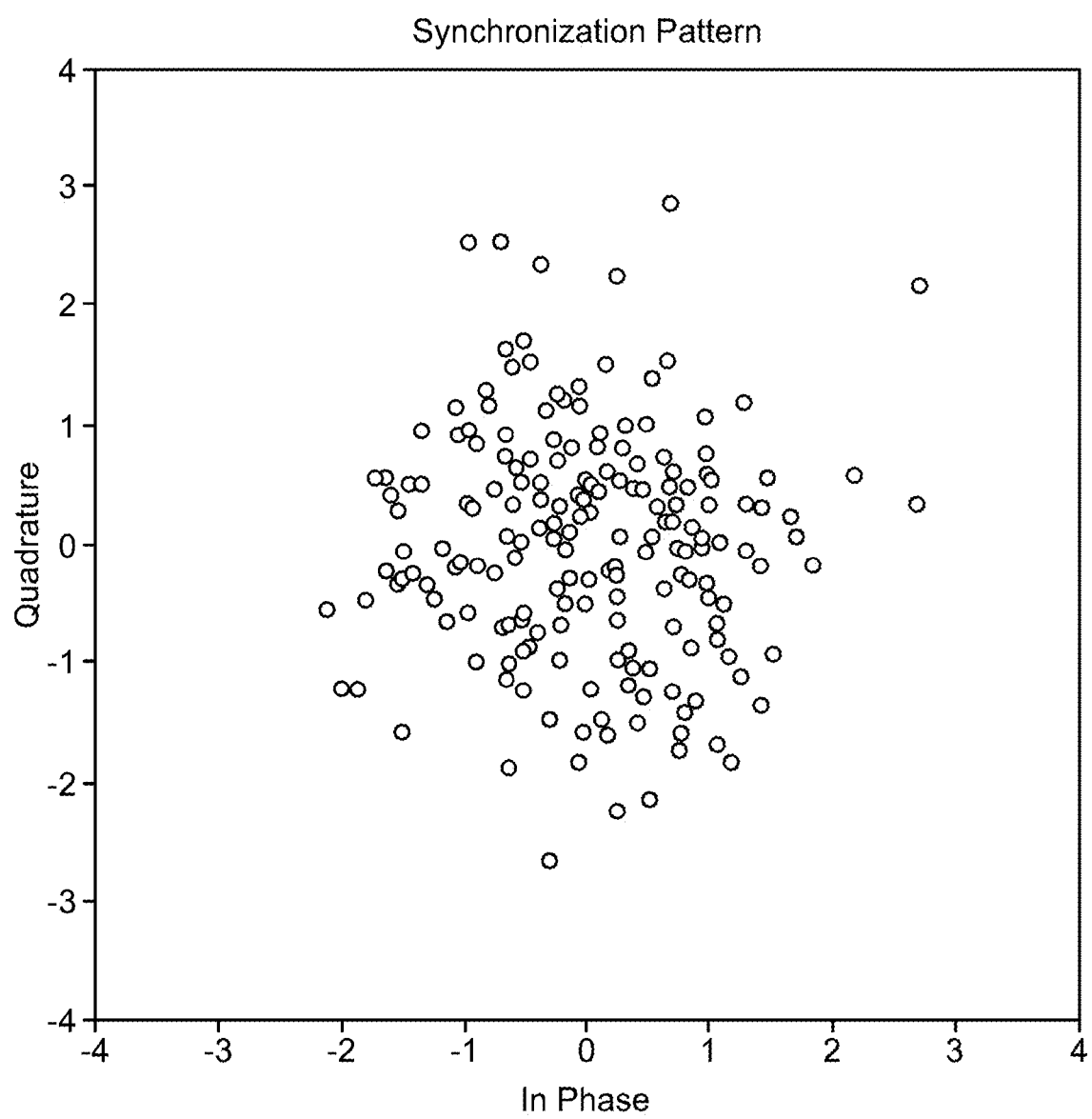
FIGS. 2-5 depict an exemplary embodiment of a raw synchronization pattern and that synchronization pattern being differentially encoded with and without symbol indexing according to one aspect of the present invention.
Figure 3:
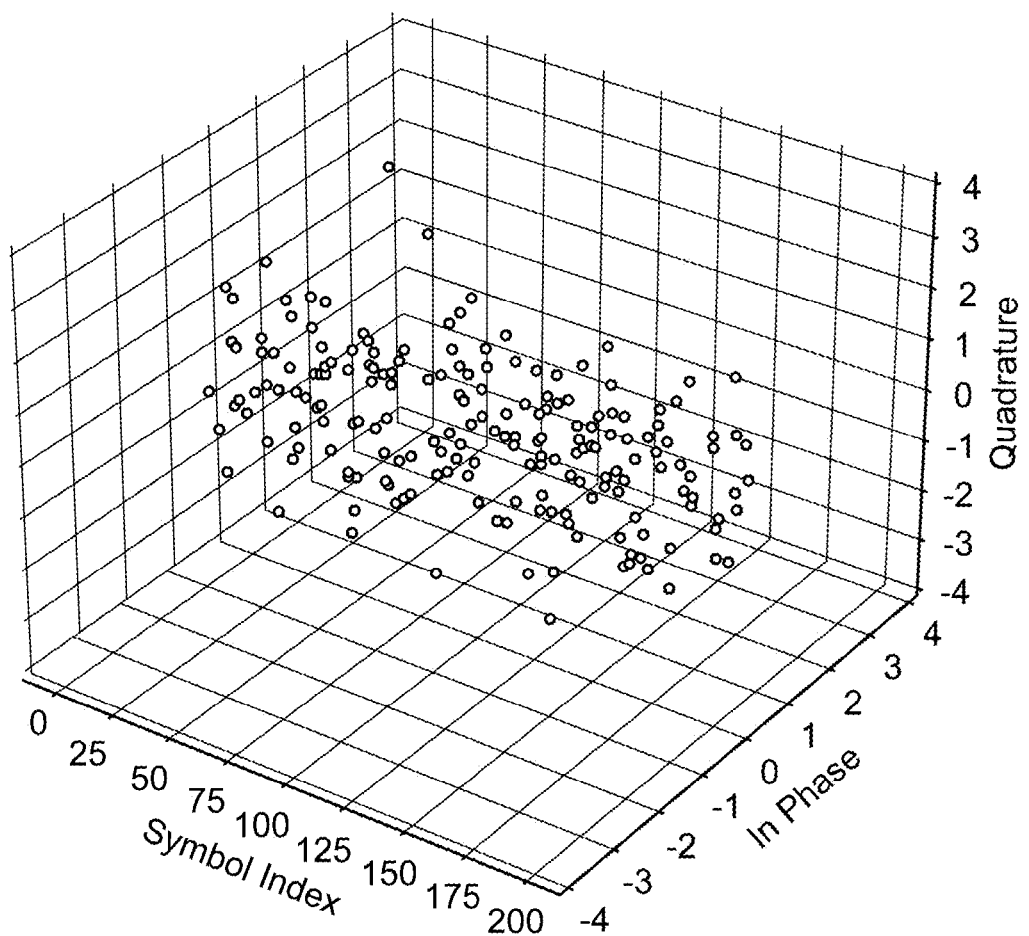
Figure 4:
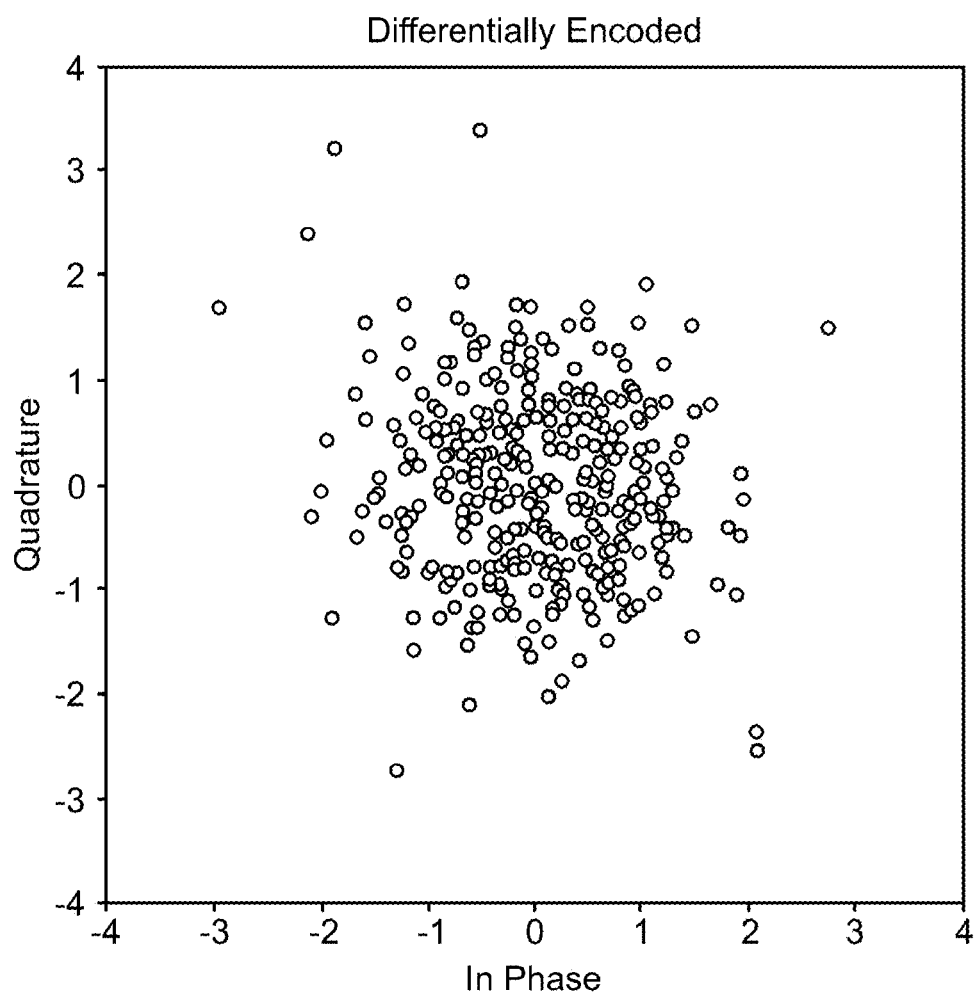
Figure 5:
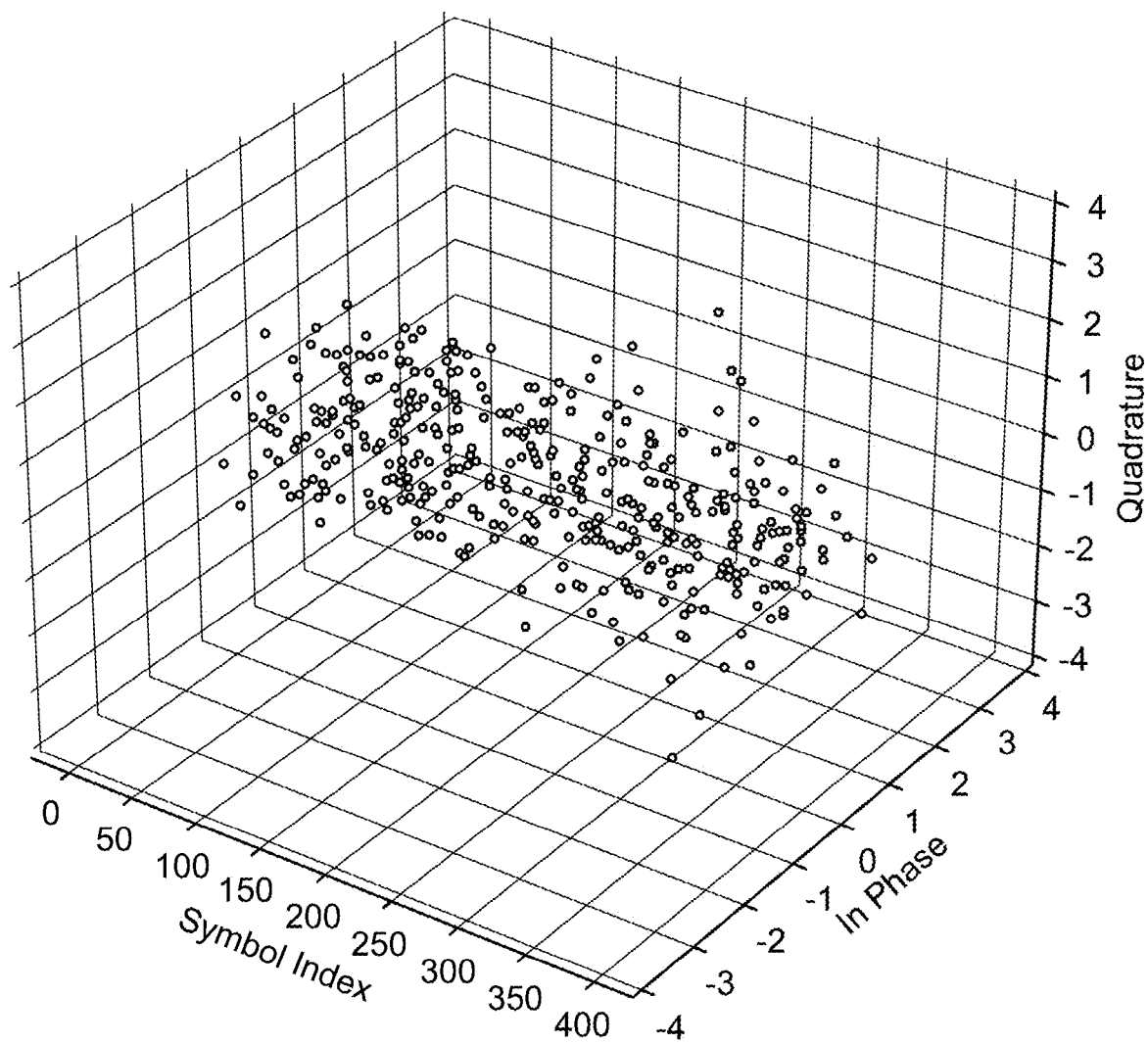

Turning to FIG. 1, an exemplary LPI/LPD waveform with both distributed carrier and distributed synchronization comprises two distinct modulation stages for data generation (based waveform generation and distributed carrier modulation), plus another stage which is used for acquisition and synchronization (distributed sync). For the information transport bursts, the "base waveform" stage and the "Distributed Carrier" stage are used. At predictable intervals, the "Distributed Sync" (DS) bursts are inserted. The overall baseband waveform generation process is illustrated in FIG. 1.

The transmitter expects a bitstream of raw bits which then generates a base waveform burst, followed by the Distributed Carrier stage which distributes the waveform to a wideband intermediate frequency (IF). The Distributed Carrier stage is described in the above patent applications that were previously incorporated by reference. The distributed carrier process is an independent process that takes the single-carrier base waveform, splits the single-carrier base waveform up in frequency (thereby creating multiple subcarriers), and then redistributes the subcarriers in a pseudo random order and channel assignment.

The Distributed Synchronization (DS) technique described herein provides efficient synchronization between a transmitter and a receiver using a waveform that requires only limited resources for detection, and yet possesses similar LPI/LPD characteristics as the Distributed Carrier waveform. The resource constrained detection requirement yields DS detectability even at a high IF bandwidth without the need for utilizing a two-dimensional search space as is prevalent with traditional synchronization techniques. Reducing the signal detection search space to one dimension (e.g., time domain) greatly reduces the computational burden on receivers, particularly for high data rate applications. The DS achieves this by differentially encoding the search pattern.

Another key design feature of a DS set of bursts is that each time the DS set is generated, the newly generated DS set is entirely dissimilar to any previously generated DS sets of bursts, thus removing any correlated energy between different sets of DS bursts all while maintaining the same differentially encoded pattern. One key to understanding the DS design is that the DS design functions only as a whole and not as individual carriers or channels even though that is the shape of the waveform. In fact, the design is such that no single carrier conveys any useful information. The cross-channel coherence required for proper alignment and subsequent detection of the DS set of bursts is made possible by large IF bandwidth hardware platforms.

Figure 10:
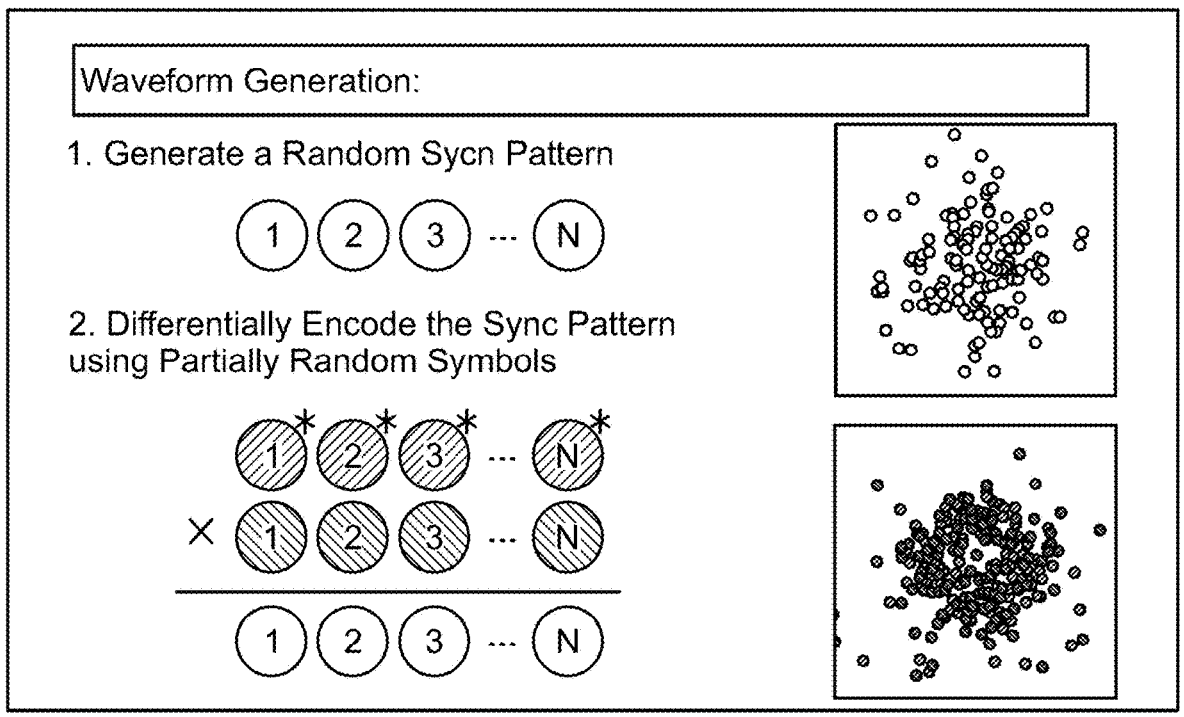
FIGS. 10-11 depict an exemplary embodiment of a method for generating a synchronization waveform according to another aspect of the present invention.

A set of DS bursts is created by first generating a sync pattern (see e.g., FIGS. 1 and 10). The pattern needs merely be a set of complex numbers rather than a particular standard complex constellation. The sync pattern is differentially encoded by randomly generating two more sets of complex numbers the same size as the sync pattern (see FIG. 10) with the constraint that the additional sets must be chosen such that the point-wise product of the second set with the conjugate of the first set is the sync pattern. In conjunction with this requirement, it may be advantageous from an LPI/LPD point of view to restrict those sets' magnitudes (see step 2 of FIG. 10). In differentially encoding the synchronization pattern using two sets of symbols, more degrees of freedom are introduced than is allowed with standard differential symbol encoding where a difference of one symbol time is used. This first constraint additionally allows a different set of differentially encoded symbols to be generated for every set of DS bursts all while using the same synchronization pattern. For illustration purposes, consider a sync pattern of 200 randomly chosen complex numbers using a complex Gaussian distribution. The sync pattern and differentially encoded symbols could look like those in FIGS. 2-5.

The next design parameter to be chosen is the number of information carrying channels and random constrained channels to be used at any given symbol time. Choosing more random constrained channels than information carrying channels guarantees that in any particular channel no portion of the sync pattern can be found even after performing the delay-conjugate-multiply (DCM) at the correct lag. This is done by distributing the differentially encoded symbols strategically through a grid of time and frequency. For example, with four information carrying channels, five random constrained channels and twenty total differentially encoded symbols (i.e., 10 synchronization symbols) the distribution in time and frequency of differentially encoded symbols may resemble FIG. 6 where black represents the information carrying symbols and white represents the random constrained ones. Notice the arrangement of the information symbols such that if an information symbol is in Channel N and Symbol Index K then a random symbol will be in Channel N and Symbol Index K plus the length of the sync pattern. For example, in Channel 6 and Symbol Index 3, an information symbol is found. Therefore, in Channel 6 and Symbol Index 13 (Index 3 plus the length of the synchronization pattern) a random constrained symbol is found. This ensures that when an individual channel has a DCM applied to it with a lag of the length of the sync pattern, there will be no information present because a random symbol will be multiplied by the conjugate of an information carrying symbol.

Detection of the sync pattern via the correlation with the DCM requires that for any symbol index, the sum of its random constrained symbols is zero (i.e., the sum of the white squares in any one column is zero) and each information carrying symbol is precisely the differentially encoded symbol for that particular symbol index (i.e., all of the black squares in any one column are the same value). With these additional requirements in place, summing the grid of symbols down the columns for each symbol index yields a value that is a multiple of the corresponding differentially encoded symbol, which yields that the DCM of the summed sequence has the sync pattern detectable.

Figure 7:
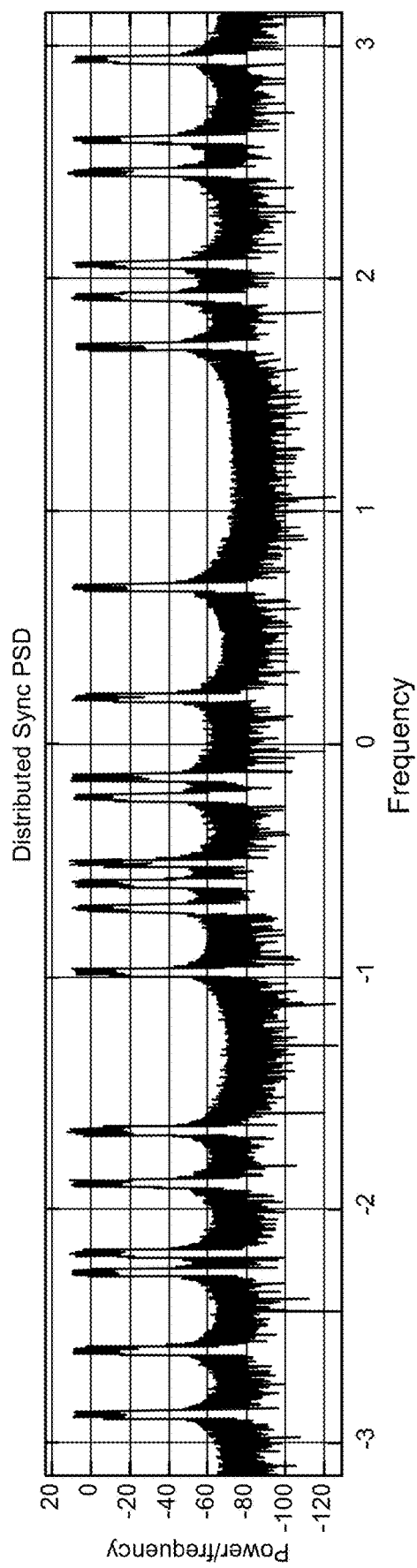
FIG. 7 depicts a power spectral density plot of an exemplary embodiment of a distributed synchronization waveform according to yet another aspect of the present invention.
Figure 11:
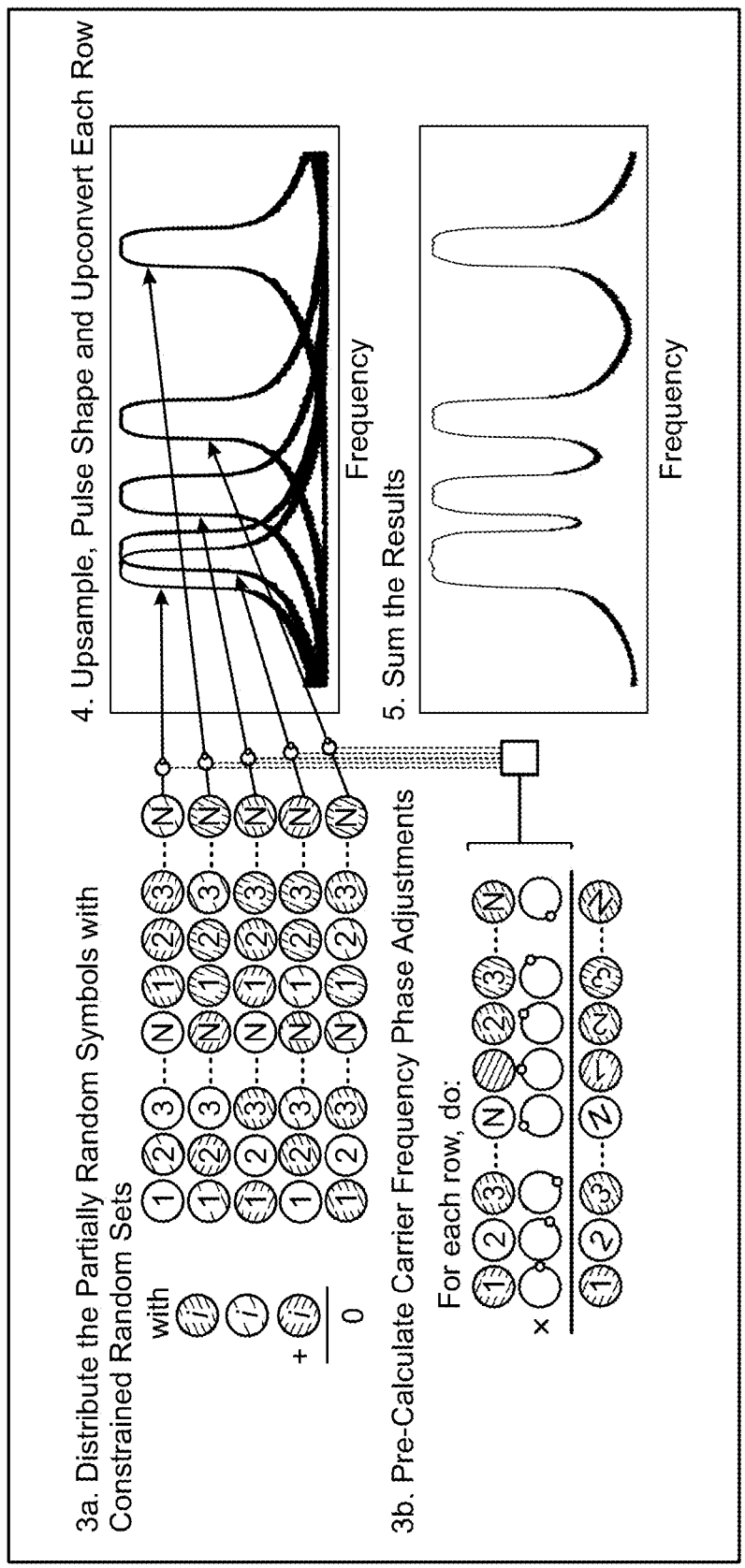
Figure 12:
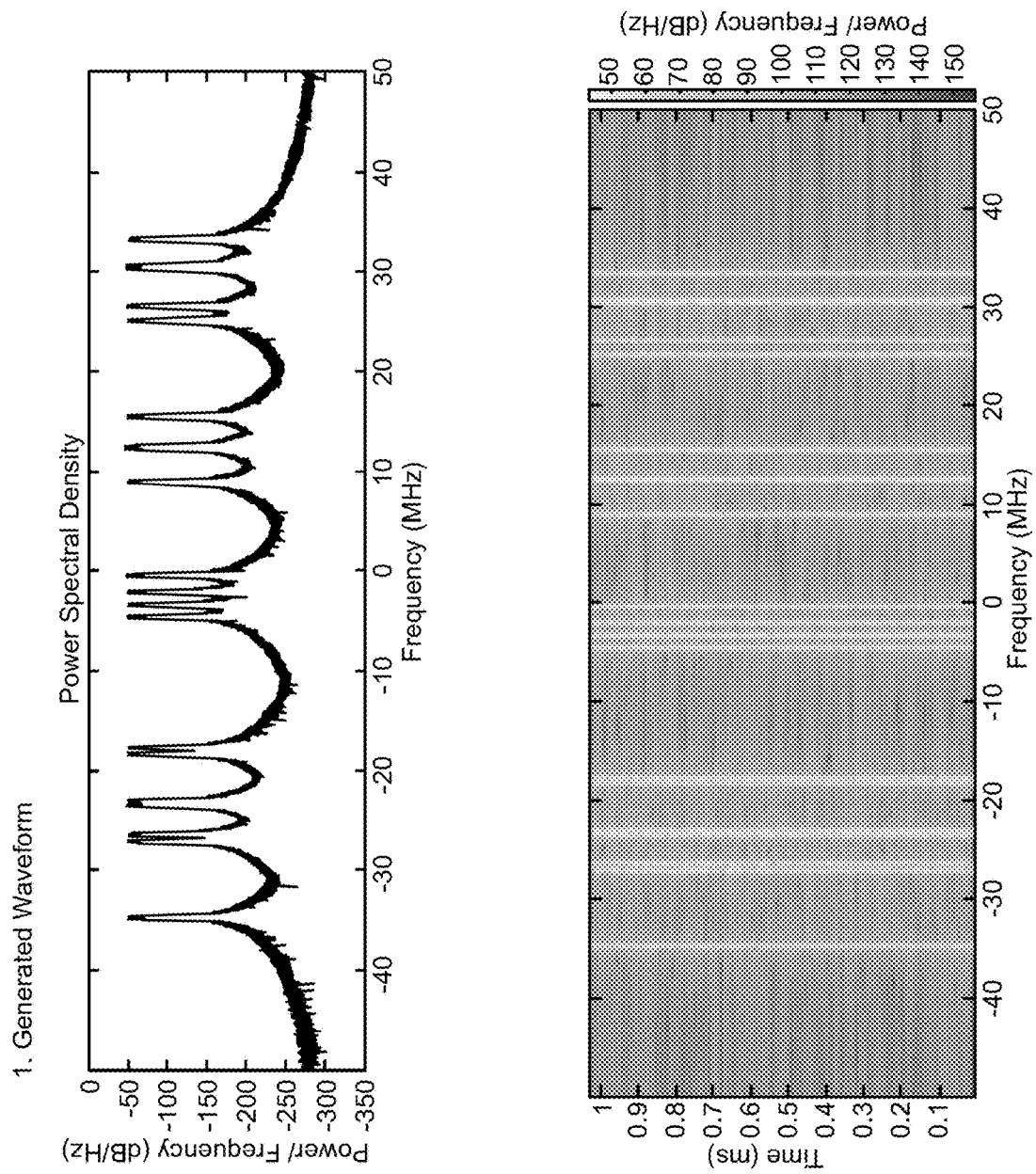
FIG. 12 depicts an exemplary embodiment of the generated waveform according to still another aspect of the present invention as shown in PSD and spectrogram plots.

The last stage of the DS set of bursts generation is to up-convert each baseband symbol set (i.e., the rows of the grid) to random carrier frequencies within the IF bandwidth of the hardware after pulse shaping with a zero-ISI filter. See FIG. 11. In order to maintain the necessary phase coherence amongst all the symbols, each baseband symbol set is negatively pre-tuned according to the random frequency assigned for that symbol set so that after the symbols are pulse shaped with a zero-ISI filter and up-converted, the symbols in each symbol set will have exactly the right phases. Those phases will then be aligned so that when taken as a whole, the entire DCM'ed DS waveform correlates with the sync pattern symbols. FIG. 7 shows the PSD after up-conversion of a single set of DS bursts. See also FIG. 12.

Figure 8:
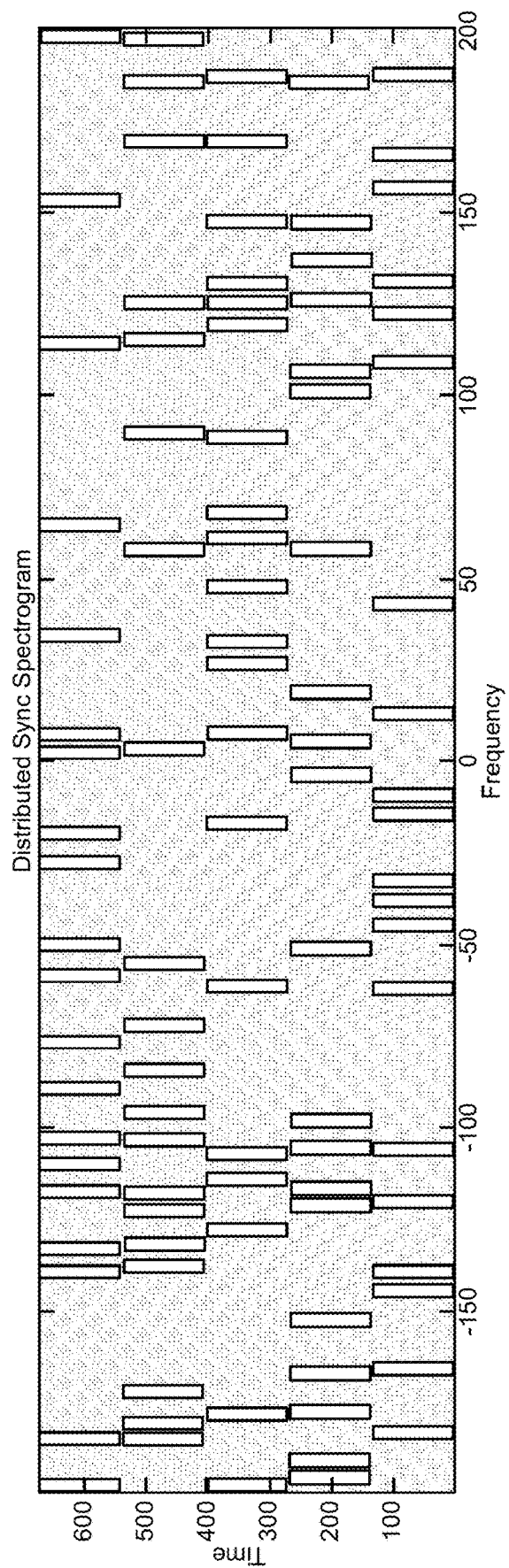
FIG. 8 depicts a spectrogram of multiple sets of bursts for an exemplary embodiment of a distributed synchronization waveform.

FIG. 8 compares five sets of DS bursts concatenated together with the addition of white gaussian noise, illustrating the frequency diversity of the waveforms themselves. The mechanism for processing any of these burst sets for detection is precisely the same even though they are very different in frequency usage. See the bottom portion of FIG. 12 also.

Figure 6:
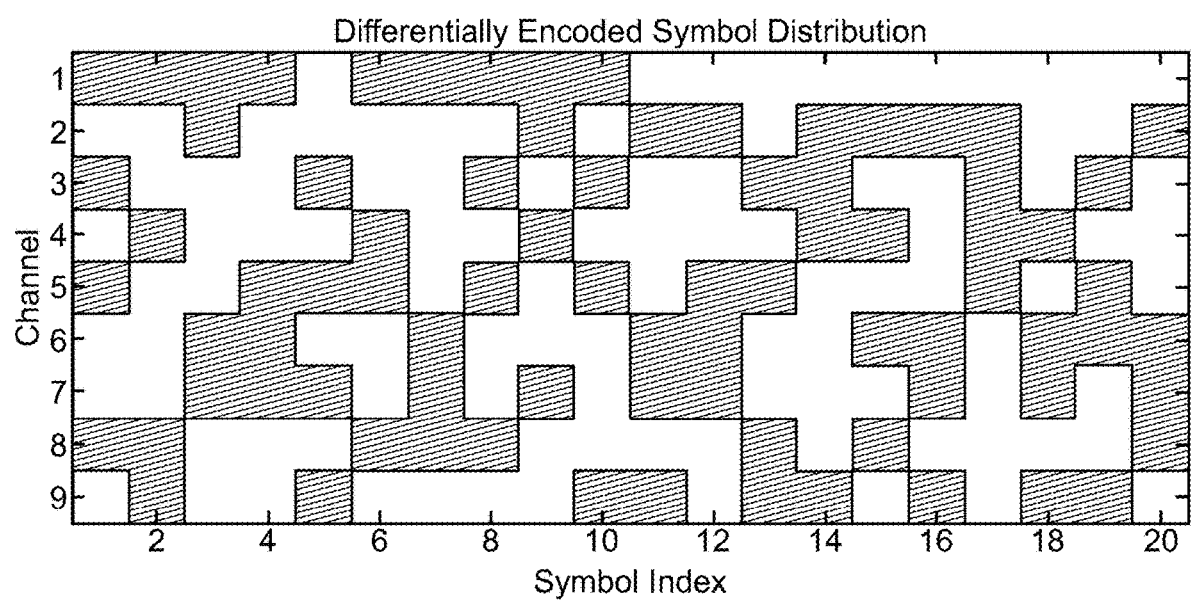
FIG. 6 depicts an exemplary embodiment of a differentially encoded symbol distribution along with a random constrained set of symbols according to another one aspect of the present invention.
Figure 9:
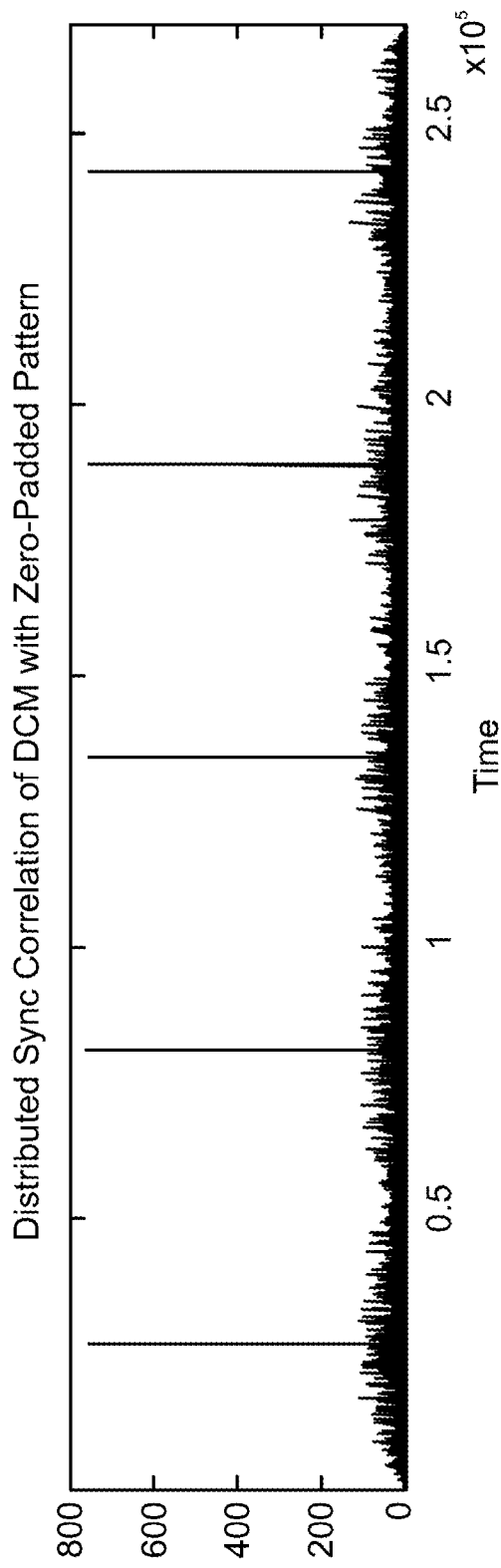
FIG. 9 depicts a correlation plot of a delay-conjugate multiply (DCM) of five sets of an exemplary embodiment of distributed synchronization bursts with zero-padded pattern.
Figure 13:
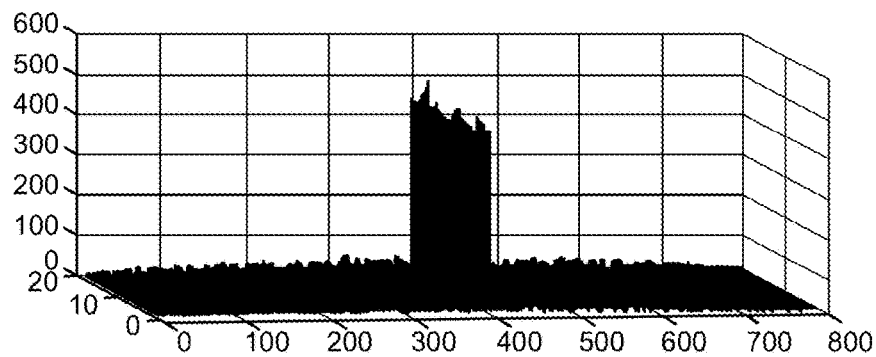
FIG. 13 depicts various auto-correlations and cross-correlations of the individual symbol sets used in the exemplary waveforms of the present invention along with the cross-correlation of the DCM of the DS with the synchronization pattern.
Figure 13:
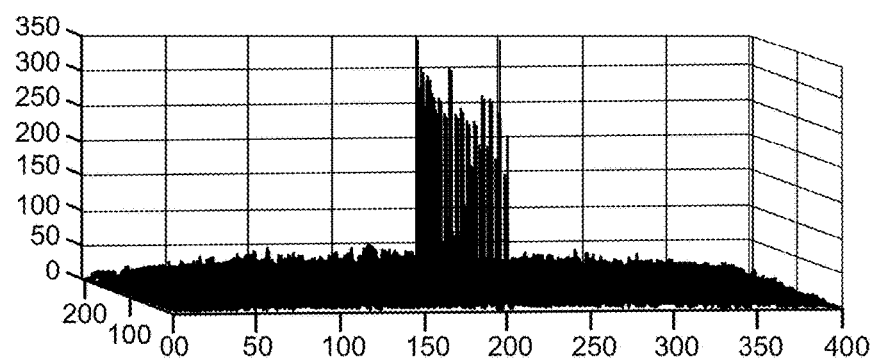
Figure 13:
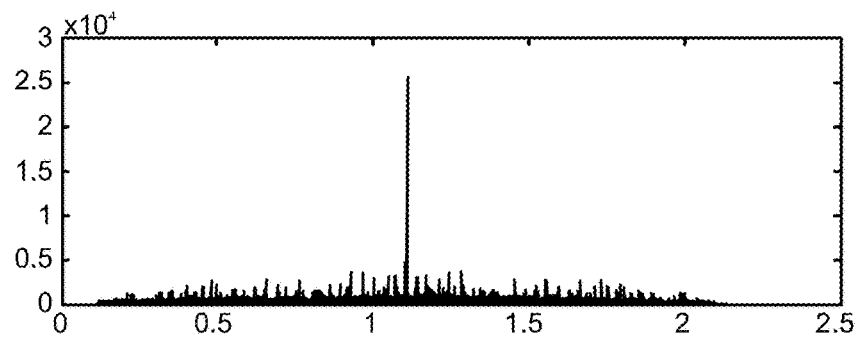

FIG. 9 shows the correlation of a zero padded version of the sync pattern with the DCM of the set of five different sets of DS bursts shown in FIG. 6. Therefore, each of the five different sets of DS bursts is detected with the exact same pattern and using the exact same mechanism (cross-correlation of the DCM) despite them being widely varying waveforms. The auto- and cross-correlations of FIG. 13 show how each individual channel has very low auto-correlation and the cross-correlations of all of the pairwise channels are also not correlated.

While the current design of the DS waveform is sufficient for the purposes of providing detectability of synchronization information at high IF rates, it is also extensible so that it can carry some amount of information as well, such as super-frame format information or Distributed Carrier frequency usage information. This extensibility of the DS technique is as follows.

The same DS waveform is also extensible so that the DS waveform can carry some amount of information as well, where this is accomplished by appending or otherwise interspersing the data symbols to or within the synchronization pattern symbols before generating the DS waveform. Since the data symbols will not be known by the receiver, the pattern for correlation will be the synchronization pattern with zeros inserted where the data symbols were placed.

What is claimed is:

1. A method for enabling a receiver to synchronize to a transmitter waveform employing a distributed carrier comprising:

using a synchronization waveform that requires only limited resources for detection while concomitantly possessing similar low probability of intercept/low probability of detection characteristics as the transmitted waveform employing a distributed carrier;

performing synchronization by using only an entirety of said synchronization waveform and not as individual carriers or channels even though that is the shape of the waveform;

providing that no single carrier conveys any useful information; and utilizing a differentially encoded synchronization search pattern in a covert communications system employing low probability of intercept/low probability of detection waveforms.

2. The method according to claim 1, further comprising reducing computation in a receiver by reducing a signal detection search space to a single dimension, wherein the single dimension comprises one or more of the following: a time domain, a frequency domain, and a domain mapped from either the time domain or the frequency domain.

3. The method according to claim 1, further comprising limiting a signal detection search space to a single dimension, wherein the single dimension comprises one or more of the following: a time domain, a frequency domain, and a domain mapped from either the time domain or the frequency domain.

4. The method according to claim 1, further comprising employing a plurality of dissimilar bursts for synchronization, thereby removing all correlated energy between different sets of synchronization bursts, while maintaining a same differentially encoded synchronization pattern.

5. The method according to claim 4, further comprising wherein each of a new plurality of dissimilar sets of bursts is entirely dissimilar to a previously generated plurality of dissimilar sets of bursts.

6. The method according to claim 1, wherein a large intermediate frequency (IF) bandwidth is employed in transmission hardware to enable all cross-channel coherence required for proper alignment and subsequent detection of a distributed synchronization set of bursts.

7. The method according to claim 1, wherein a distributed synchronization system creates a set of distributed synchronization bursts by first generating a synchronization pattern, wherein said synchronization pattern comprises a set of complex numbers rather than requiring that it be constrained to a particular, standard constellation.

8. The method according to claim 7, wherein the synchronization pattern is differentially encoded.

9. The method according to claim 7, wherein the synchronization pattern is differentially encoded by randomly generating two more sets of complex numbers having a same size as the synchronization pattern for each distributed synchronization set of bursts.

10. The method according to claim 9, wherein said two more sets of complex numbers comprises a first set and a second set, wherein a point-wise product of a second set of with a conjugate of a first set equals the synchronization pattern.

11. The method according to claim 9, wherein different sets of differentially encoded symbols are generated for every set of distributed synchronization bursts all while using the same synchronization pattern.

12. The method according to claim 9, wherein at any given symbol time more random constrained channels are employed than information carrying channels.

13. The method according to claim 12, wherein a plurality of differentially encoded symbols are distributed strategically through a grid of time and frequency.

14. The method according to claim 12, wherein an arrangement of information symbols is such that if an information symbol is in Channel N and Symbol Index K, then a random constrained symbol will be in Channel N and Symbol Index K plus the length of the sync pattern.

15. The method according to claim 12, wherein detection of the synchronization pattern via a correlation with a delay conjugate multiplication requires that for any symbol index, a sum of its random constrained symbols is zero and each information carrying symbol is precisely the differentially encoded symbol for that particular symbol index.

16. The method according to claim 15, wherein summing a grid of symbols down a plurality of columns for each symbol index yields a value that is a multiple of a corresponding differentially encoded symbol, which yields that a delay conjugate multiplication of the summed sequence has the synchronization pattern detectable.

17. The method according to claim 15, wherein a final stage of generating the distributed synchronization set of bursts is to up-convert each baseband symbol set to a plurality of random carrier frequencies within an IF bandwidth of the hardware transmitter.

18. The method according to claim 17, wherein to maintain a necessary phase coherence amongst all symbols, each baseband symbol set is negatively pre-tuned according to the random frequency assigned for that baseband symbol set so that after the baseband symbols are pulse shaped with a zero-ISI filter and up-converted, the symbols in each symbol set will have exactly a correct phase, wherein said correct phases are aligned so that when taken as a whole an entire distributed synchronization waveform can be delay conjugate multiplied without extracting any individual DS channels and then correlated with the synchronization pattern symbols.

19. The method according to claim 18, wherein each of the different sets of distributed synchronization bursts is detected with an exact same pattern despite them being widely varying waveforms.

20. The method according to claim 19, wherein the distributed synchronization waveform provides detectability of synchronization information at high IF rates, and the distributed synchronization waveform can additionally carry information unknown to the receiver yet extractable post-correlation and detection of the synchronization pattern, such as super-frame format information or distributed carrier frequency usage information.

* * * * *